United States Patent
Wilcox et al.

(10) Patent No.: US 9,488,339 B2
(45) Date of Patent: Nov. 8, 2016

(54) LENS WITH CONTROLLED BACKLIGHT MANAGEMENT

(71) Applicant: Cree, Inc., Durham, NC (US)

(72) Inventors: Kurt S. Wilcox, Libertyville, IL (US); Christopher Strom, Racine, WI (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/747,586

(22) Filed: Jun. 23, 2015

(65) Prior Publication Data

US 2015/0285466 A1    Oct. 8, 2015

Related U.S. Application Data

(63) Continuation of application No. 13/735,701, filed on Jan. 7, 2013, which is a continuation of application No. 12/475,194, filed on May 29, 2009, now Pat. No. 8,348,475, which is a continuation-in-part of application No. 12/173,721, filed on Jul. 15, 2008, now Pat. No. 8,388,193.

(60) Provisional application No. 61/055,958, filed on May 23, 2008.

(51) Int. Cl.
| | |
|---|---|
| *F21V 5/00* | (2015.01) |
| *F21V 13/04* | (2006.01) |
| *F21V 5/04* | (2006.01) |
| *F21V 7/00* | (2006.01) |
| *F21V 13/02* | (2006.01) |
| *G02B 19/00* | (2006.01) |
| *F21V 5/08* | (2006.01) |
| *F21Y 101/02* | (2006.01) |
| *F21Y 105/00* | (2016.01) |

(52) U.S. Cl.
CPC ............. *F21V 13/04* (2013.01); *F21V 5/008* (2013.01); *F21V 5/04* (2013.01); *F21V 5/08* (2013.01); *F21V 7/0091* (2013.01); *F21V 13/02* (2013.01); *G02B 19/0028* (2013.01); *G02B 19/0061* (2013.01); *F21Y 2101/02* (2013.01); *F21Y 2105/001* (2013.01)

(58) Field of Classification Search
USPC .................. 362/244, 311.01, 311.02, 311.06, 362/311.1, 311.14, 311.15, 326, 327, 329, 362/331, 332–340, 522
See application file for complete search history.

(56) References Cited

U.S. PATENT DOCUMENTS

| | | | |
|---|---|---|---|
| 6,924,943 B2 * | 8/2005 | Minano | G02B 3/08 359/720 |
| 8,573,815 B2 | 11/2013 | Mallory et al. | |

* cited by examiner

*Primary Examiner* — Andrew Coughlin
*Assistant Examiner* — Meghan Ulanday
(74) *Attorney, Agent, or Firm* — Jansson Munger McKinley & Kirby Ltd.

(57) ABSTRACT

A lens for distribution of light predominantly toward a preferential side from a light emitter having an emitter axis. The lens includes an outer surface, a reflecting inner surface and a reflecting back surface. The reflecting inner surface is positioned and configured for total internal reflection (TIR) of received light toward the lens outer surface. The reflecting back surface is positioned and configured for total internal reflection (TIR) of received light toward the preferential side.

20 Claims, 11 Drawing Sheets

LENS WITH CONTROLLED BACKLIGHT MANAGEMENT

RELATED APPLICATION

This application is a continuation of patent application Ser. No. 13/735,701, filed Jan. 7, 2013, which is a continuation of patent application Ser. No. 12/475,194, filed May 29, 2009, now U.S. Pat. No. 8,348,475, issued Jan. 8, 2013, which is a continuation-in-part of U.S. application Ser. No. 12/173,721, filed on Jul. 15, 2008, now U.S. Pat. No. 8,388,193, issued Mar. 5, 2013, which is based in part on U.S. Provisional Application Ser. No. 61/055,958, filed May 23, 2008. The entirety of the contents of patent application Ser. Nos. 13/735,701, 12/475,194, 12/173,721, and 61/055,958 are incorporated herein by reference.

FIELD OF THE INVENTION

This invention relates to lighting fixtures and, more particularly, to LED lighting fixtures for various common illumination purposes. Still more specifically, this invention relates to the field of lensing for desired LED light distribution in LED lighting fixtures.

BACKGROUND OF THE INVENTION

In recent years, the use of light-emitting diodes (LEDs) for various common lighting purposes has increased, and this trend has accelerated as advances have been made in LEDs and in LED-array bearing devices, referred to as "LED modules." Indeed, lighting needs which have primarily been served by fixtures using high-intensity discharge (HID) lamps, halogen lamps, compact florescent light and other light sources are now increasingly beginning to be served by LEDs. Creative work continues in the field of LED development, and also in the field of effectively utilizing as much of the light emitted from LEDs as possible.

As is known, LED "packages," which typically consist of a single LED (or small LED cluster) on a base with or without a "primary lens," each have an individual lens thereover to direct light from the LED package as intended. (Such lens is sometimes referred to as a "secondary" lens when the package with which it is used includes a primary lens.) Development efforts have been made in the field of such lenses, with the intention being to redirect some of the package-emitted light in a manner forming illumination patterns desired for particular applications. However, such lenses have tended to fall short of the most desirable performance in that some LED-emitted light is lost.

Typically, some of the light from LEDs is emitted at angles that cause LED-lighting fixtures to provide less than desirable and less than fully efficient illumination patterns. Some prior lenses have been configured to prevent undesirable light from exiting the lens and others to block such light immediately upon its exiting the lens. Even though these configurations were deemed necessary to achieve desired illumination patterns and to prevent so-called lighting "trespass," they tended to result in lost light and decreased efficiency of LED illuminators. It would be highly desirable to improve efficiency of the use of light emitted by LEDs in lighting fixtures.

A typical LED emits light over a wide range of angles such that light from the LED reaches a particular area of the output surface of the lens at somewhat different angles. This has made it very difficult to control refraction of such light. As a result, only a portion of light being refracted is refracted in a desired direction, while the remainder exits the lens with very little control. It would be desirable to provide improved control of the direction of light exiting such lenses.

Trespass lighting can be evaluated by more than just the amount of light emitted in an undesired direction; also to be considered is how far from the desired direction such light is directed. It would be highly beneficial to provide a lighting apparatus which produces a desired illumination pattern with a maximum amount of light emitted toward the space intended to be illuminated, in typical commercial applications.

OBJECTS OF THE INVENTION

It is an object of the invention to provide improved LED lensing to overcome some of the problems and shortcomings of the prior art, including those referred to above.

Another object of the invention is to provide an LED lens with improved light-output efficiency for a variety of particular uses.

Another object of the invention is to provide an LED lens with improved control of the direction of light exiting the lens.

How these and other objects are accomplished will become apparent from the following descriptions and the drawings.

SUMMARY OF THE INVENTION

This invention is a lens with improved efficiency of distribution of light predominantly toward a preferential side from a light emitter such as an LED package having an emitter axis and defining an emitter plane. It is preferred that the light emitter is the LED package which is free of a surrounding reflective surface. Such improved efficiency of light output from the light emitter is achieved with the inventive lens which is specifically designed for refraction and useful output of light emitted in directions opposite to the desired illumination direction. The inventive lens directs the great majority of light from the emitter in the preferential-side direction, including light emitted at angles which previously resulted in the loss of such light. Such efficiency of light use is provided without use of separate reflectors—that is, on a lens-only basis.

The inventive lens has an emitter-adjacent base end which forms an emitter-receiving opening to an emitter-surrounding cavity defined by an inner surface. The inner surface includes a front sector centered on the preferential side and a back sector centered on the non-preferential side radially opposite the preferential side. The front sector has a first configuration for refracting light from the emitter. The back sector has a second configuration for refracting light from the emitter. It is highly preferred that the second configuration differs from the first configuration. The lens also includes an axially-offset primary back surface positioned to receive light from at least a portion of the inner-surface back sector and configured for total internal reflection (TIR) thereof. Light from the primary back surface is directed toward the preferential side.

The term "toward," as used herein with respect to direction of light after refraction or TIR, means that, after refraction or TIR such light moves closer to the indicated direction even if still diverging from the indicated direction. For example, "toward the preferential side" means that, if after refraction or TIR the light still moves in the non-preferential direction, it does so at an angle closer (than prior to the refraction or TIR) to the particular axial plane which distinguishes the preferential side from the non-preferential side.

In highly preferred embodiments of the present invention, the inner-surface back sector and the primary back surface have substantially elliptical cross-sections in planes substantially parallel to the emitter plane.

The term "elliptical," as used herein with respect to cross-sections of a surface in planes substantially parallel to the emitter plane, means that such cross-sections are portions of ellipses. The term "wide side," as used with respect to an ellipse, means a side which faces the major axis of the ellipse.

Referring to such elliptical cross-sections, it is preferred that each cross-section be symmetrical about its midpoint, and that it be centered on the plane extending from the center of the non-preferential side to the center of the preferential side. In the preferred embodiments in which the elliptical cross-section face the ellipse major axis, the distances from each elliptical cross-section to the emitter axis increase at positions away from the plane extending from the center of the non-preferential side to the center of the preferential side. Such configuration allows wide-angle distribution of emitter light to the preferential side. In other embodiments, in which the cross-sections of the inner-surface back sector and the primary back surface have shorter radii of curvature, narrower and farther patterns of light distribution toward the preferential side are achieved.

The front sector preferably extends about the emitter axis along an arc that is greater than the arc along which the back sector extends. In preferred embodiments of the inventive lens, the back-sector arc is about half the front-sector arc. The lens is substantially bilaterally symmetrical about a plane including the emitter axis.

In the inventive lens, the emitter-adjacent base end preferably forms a back opening to a back cavity substantially centered on the non-preferential side and partially bounded by the primary back surface. The primary back surface transitions from near the inner-surface back sector at the emitter plane away from the emitter axis to terminate at a position distal from the base end. It is preferred that the back cavity is further bounded by an axially-remote secondary back surface and an end surface. The incidental light that enters the back cavity is preferably dispersed by the secondary back surface. The end surface extends from the primary back surface to the secondary back surface. The secondary back surface extends from the end surface to the base end and preferably has substantially elliptical cross-sections in planes parallel to the emitter plane.

The inner-surface back sector preferably includes an intermediate back zone configured for refracting emitter light predominantly toward the primary back surface for TIR thereof toward the preferential side.

In preferred embodiments, the inner-surface back sector also includes an axially-adjacent back zone. The axially-adjacent back zone is configured for refracting emitter light away from the emitter plane and joins the intermediate back zone by transitioning from the emitter axis away from the emitter plane. The axially-adjacent back zone is preferably substantially cross-sectionally convex.

It is preferred that the intermediate back zone includes a first intermediate back section extending away from the emitter axis. In such embodiments, the intermediate back zone further preferably includes second and third intermediate sections. The second intermediate back section preferably extends from the first intermediate back section to the axially-adjacent back zone. The third intermediate back section preferably transitions from the first intermediate back section toward the emitter plane and is configured for refracting emitter light toward the emitter plane with progressively lesser refraction at positions progressively closer to the emitter plane. It is preferred that the second and third intermediate back sections extend substantially orthogonally to the emitter plane and have substantially elliptical cross-sections in planes parallel to the emitter plane.

The term "toward the emitter plane" means that after being refracted the light moves at smaller angles with respect to the emitter plane than prior to the refraction. The term "away from the emitter plane" means that after being refracted the light moves at greater angles with respect to the emitter plane than prior to the refraction.

The inventive lens further includes an outer surface configured for refracting emitter light in predominantly off-axis directions toward the preferential side. The outer surface has front and back output regions. The back output region is configured for refracting a preponderance of light received from the inner-surface back sector and the primary back surface toward the preferential side. The back output region is further configured for receiving at least a portion of light from the first intermediate back surface and distributing it toward useful illumination of the non-preferential side.

In preferred embodiments of this invention, the inner-surface front sector includes a first, second and middle front regions. The first front region is adjacent to the emitter axis and is preferably configured for refracting emitter light toward the emitter plane. The second front region is spaced from the first front region and is preferably configured for refracting emitter light away from the emitter plane. The middle front region joins and is substantially cross-sectionally asymptotical to the first and second front regions. It is preferred that the middle front region is positioned with respect to the emitter to refract light toward the emitter plane by progressively lesser amounts at positions progressively closer to the second front region.

In the preferred embodiments of the present invention, the front output region of the outer surface is configured for refracting light from the inner-surface front sector such that at the outer surface light from each front region is refracted substantially without overlapping light from other front regions.

The second front region preferably terminates before reaching the emitter plane. The inner-surface front sector further preferably includes a base-adjacent front region which extends from the second front region and is configured such that the light emitted between the second front region and the emitter plane passes through the base-adjacent front region substantially free of refraction.

The preferred embodiments of the inventive lens further include a peripheral front surface positioned to receive light from the base-adjacent front region and configured for total internal reflection (TIR) thereof toward the outer surface. In such embodiments, the emitter-adjacent base end preferably forms a front opening to a front cavity centered on the preferential side and partially bounded by the peripheral front surface.

As noted earlier, efficient use of LED light is important, particularly in applications involving illumination toward a preferential side. The inventive lens, in its preferred embodiments, is capable of directing 10% more of the total emitted light toward the preferential side than with prior lenses designed for preferential-side distribution. In such preferred embodiments, the inventive lens effectively utilizes as much as 90% of the emitter light for achieving useful illumination.

DETAILED DESCRIPTION OF PREFERRED EMBODIMENTS

Figure 1:
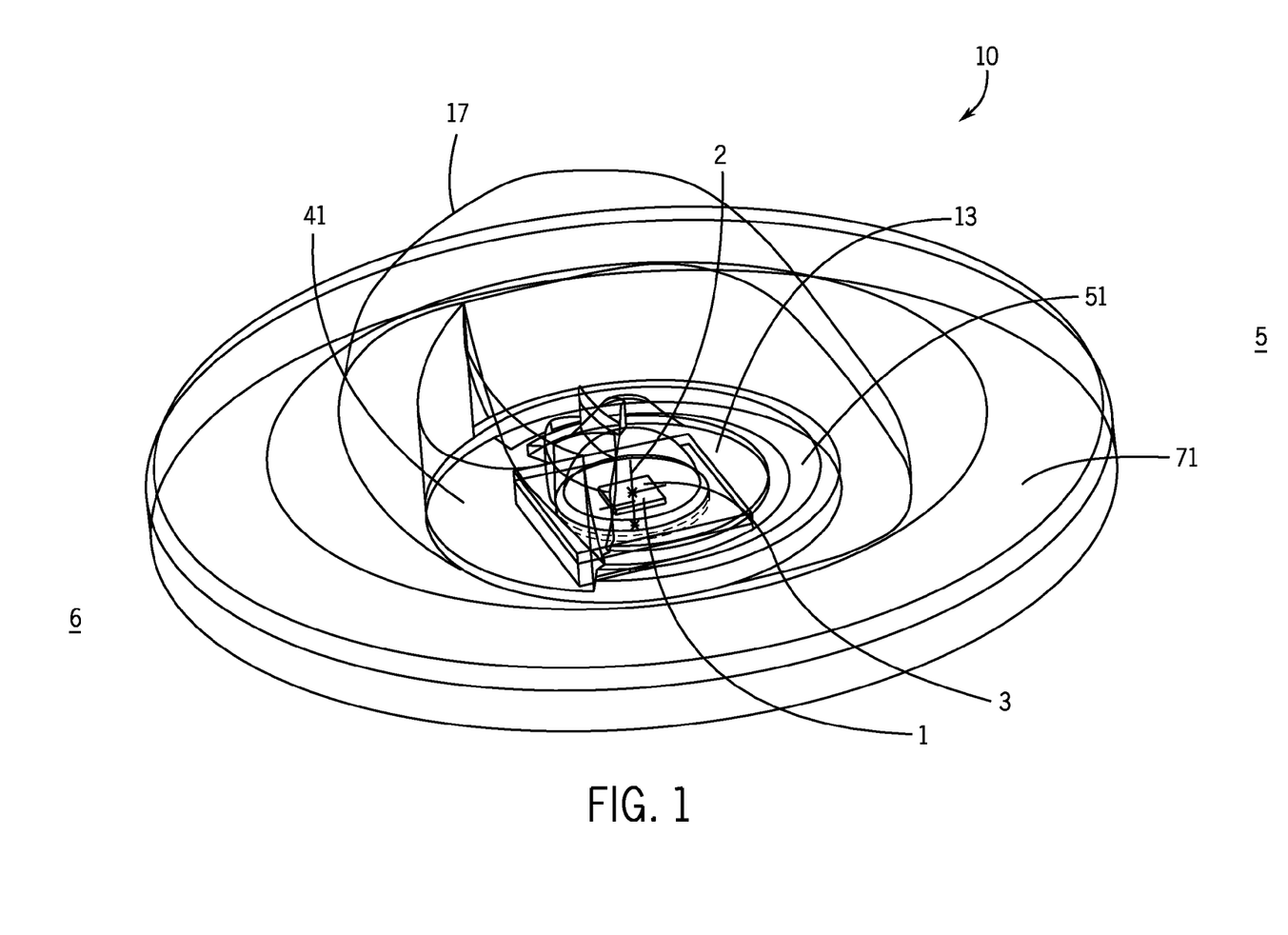
FIG. 1 is an enlarged perspective view of the inventive lens.

FIGS. 1-20 illustrate lens 10 which is a preferred embodiment of the invention. Lens 10 is for distribution of light predominantly toward a preferential side 5 from a light emitter 1 which has an emitter axis 2 and defines an emitter plane 3. As seen at least in FIGS. 1 and 2, light emitter 1 is an LED package which is free of a surrounding reflective surface.

Lens 10 has an emitter-adjacent base end 11 which forms an emitter-receiving opening 12 to an emitter-surrounding cavity 13 defined by an inner surface 14. Cavity 13 defines a space between emitter 1 and an inner-cavity surface 14 such that emitter light goes through air to enter lens material at inner-cavity surface 14. Because air and the lens material, which may be acrylic or other suitable material, have different refraction indexes, this results in bending of the light at inner-cavity surface 14.

Figure 12:
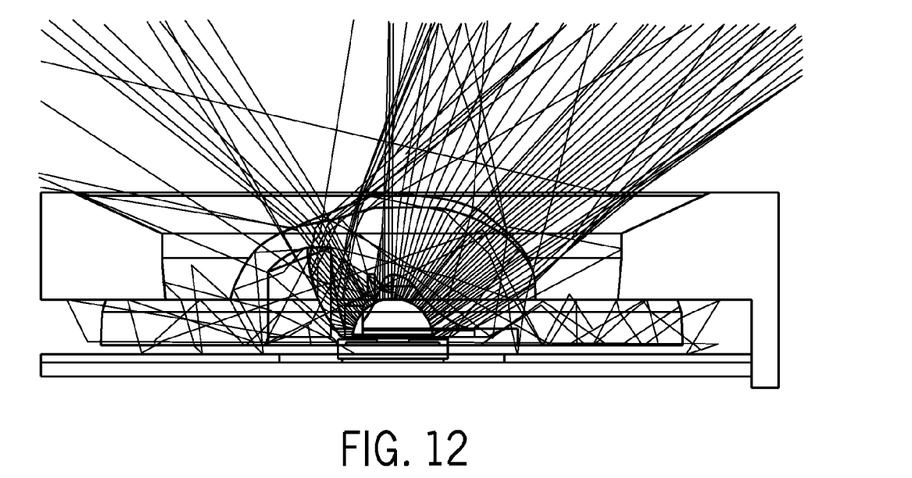
FIG. 12 is an enlarged cross-sectional side view of the lens of FIG. 1 showing refraction of the emitter light.
Figure 13:
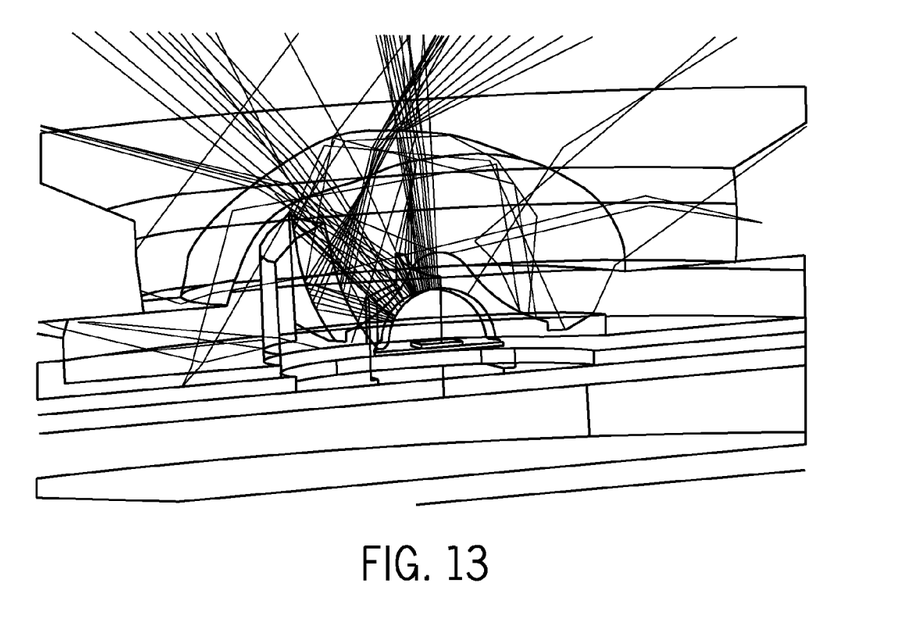
FIG. 13 is an enlarged cross-sectional perspective view of the lens of FIG. 12 showing refraction of the emitter light by the inner-cavity back sector and primary back surface.
Figure 14:
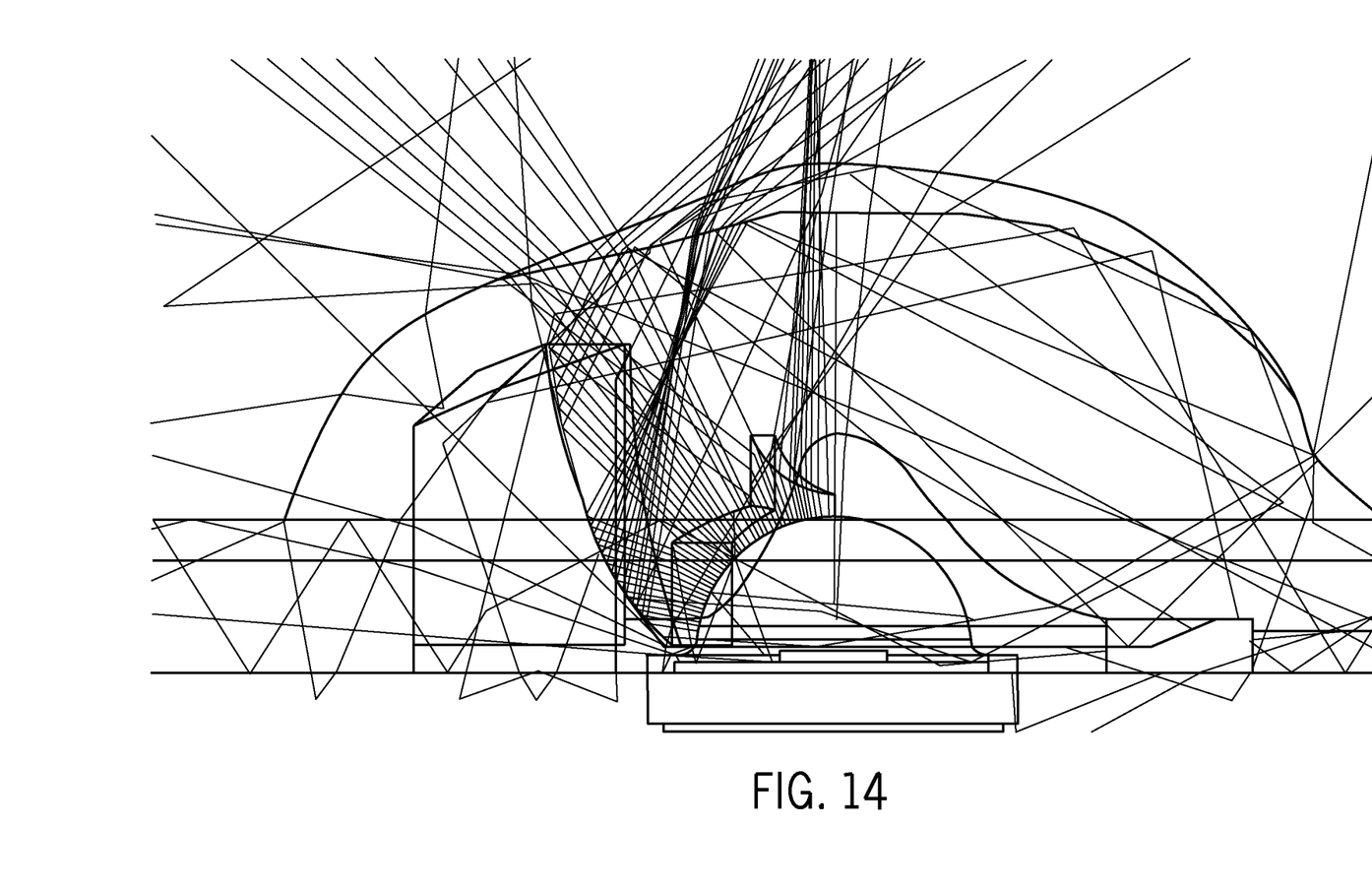
FIG. 14 is an enlarged fragmentary cross-sectional side view of the lens of FIG. 12 showing distribution of the emitter light from the inner-cavity back sector and primary back surface.

Inner surface 14 includes a front sector 20 centered on preferential side 5 and a back sector 30 centered on the non-preferential side 6 which is radially opposite preferential side 5. As best seen in FIGS. 1-5, front sector 20 has a first configuration for refracting light from emitter 1. Back sector 30 has a second configuration for refracting light from emitter 1. The second configuration differs from the first configuration. Lens 10 also includes an axially-offset primary back surface 15 positioned to receive light from at least a portion of inner-surface back sector 30 and configured for total internal reflection (TIR) thereof. As illustrated in FIGS. 12-14, light from primary back surface 15 is directed toward preferential side 5.

Figure 5:
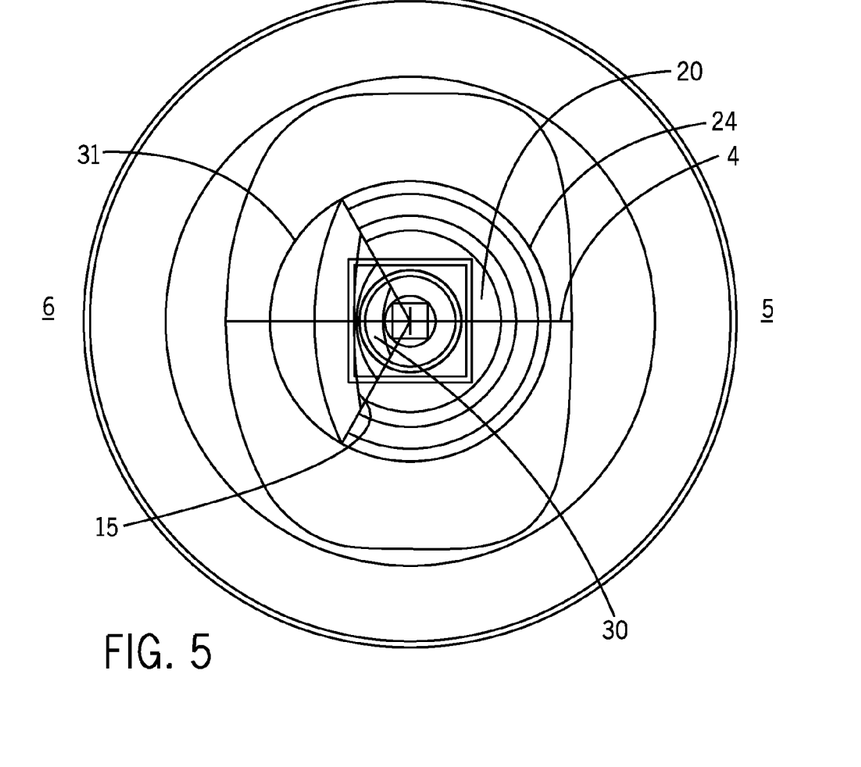
FIG. 5 is an enlarged top plan view of the lens of FIG. 1.
Figure 6:
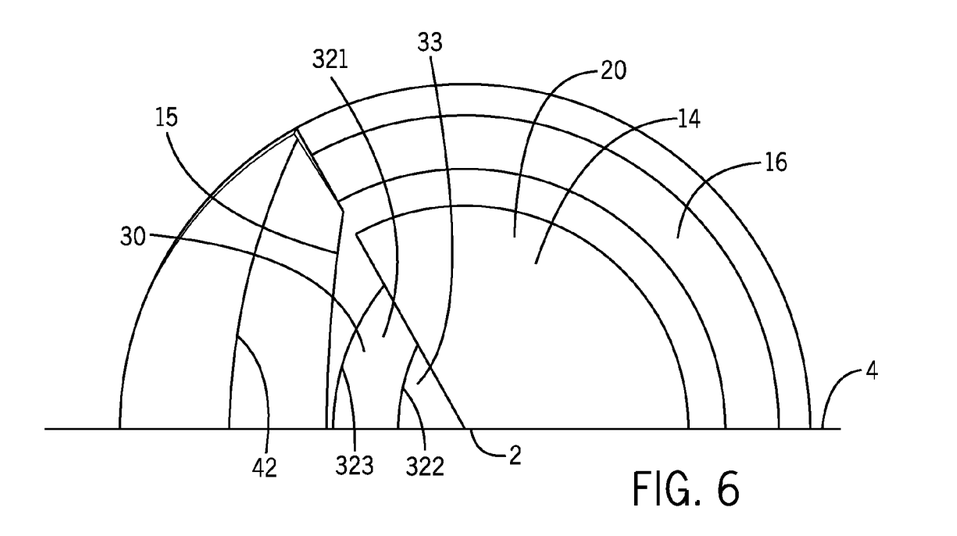
FIG. 6 is a greatly enlarged fragment of the top view of the lens of FIG. 5.
Figure 7:
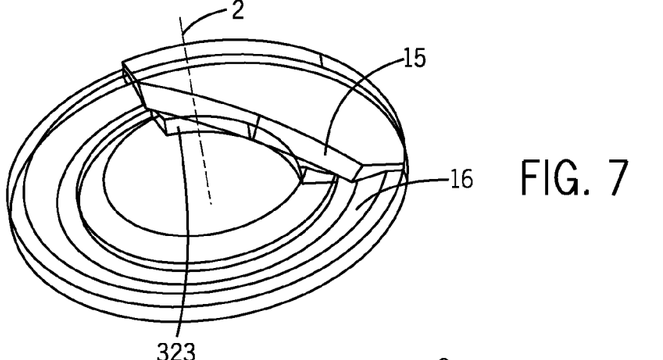
FIG. 7-9 are enlarged fragmentary cross-sectional perspective view of the lens of FIG. 1 showing cross-sections in planes substantially parallel to the emitter axis.
Figure 8:
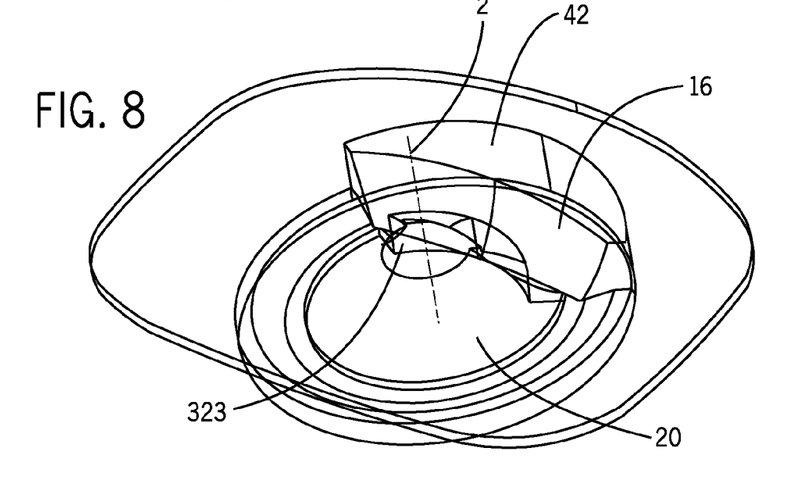
Figure 9:
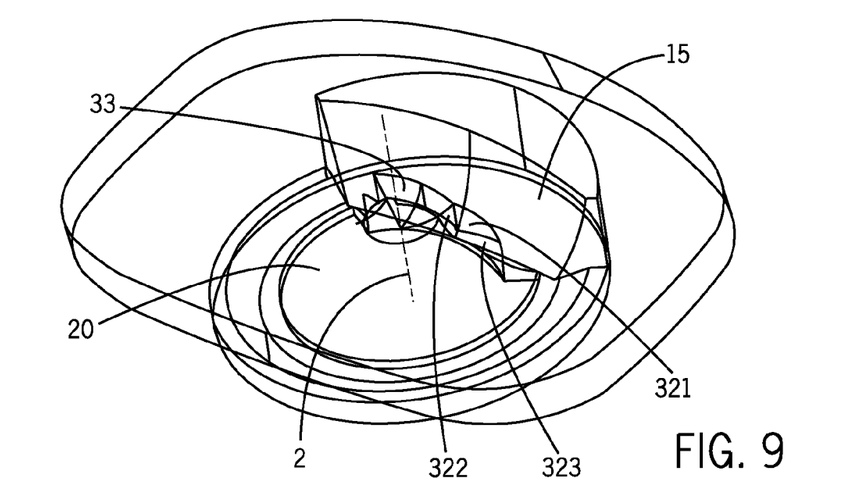
Figure 10:
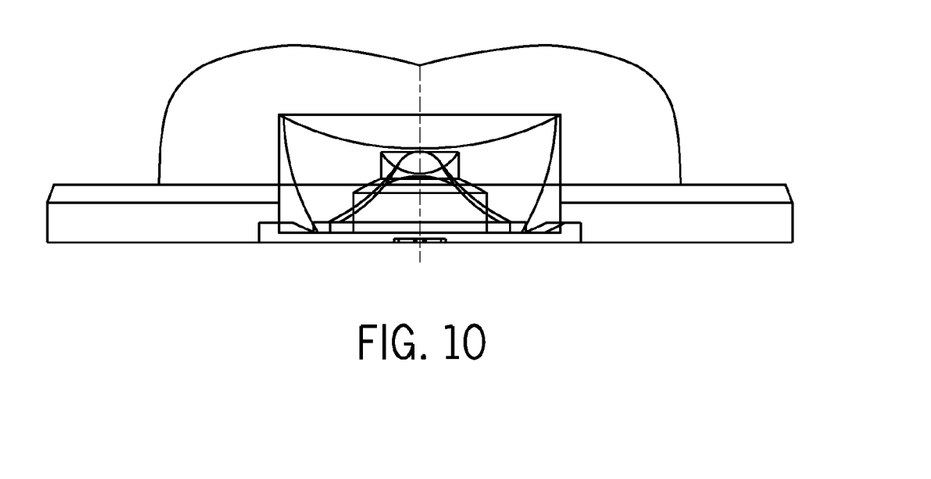
FIG. 10 is an enlarged cross-sectional front view of the lens of FIG. 1.
Figure 11:
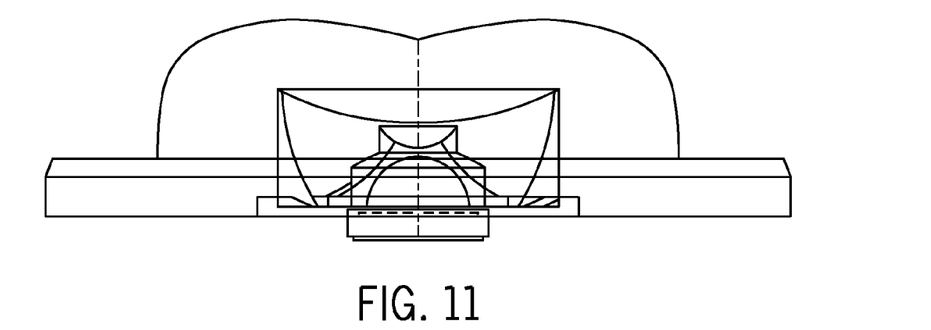
FIG. 11 is an enlarged back view of the lens of FIG. 1.

FIGS. 1 and 5-9 show that inner-surface back sector 30 and primary back surface 15 have substantially elliptical cross-sections in planes substantially parallel to emitter plane 3. FIGS. 7-9 show cross-sections in planes parallel to emitter plane 3 at different distances from emitter plane 3.

FIG. 6 further illustrates elliptical curvatures of inner-surface back sector 30 and primary back surface 15. FIG. 6 best shows how these cross-sections extend from their respective points which are along a plane of lens symmetry 4 and are closest to emitter axis 2 away from symmetry plane 4 to positions which are farthest from emitter axis 2.

It is best shown in FIG. 5 that front sector 20 extends about emitter axis 2 along an arc 24 and that the back sector extends along an arc 31. Front-sector arc 24 is greater than back-sector arc 31. FIG. 5 further shows that back-sector arc 31 is about half front-sector arc 24. It can further be seen in FIG. 5 that lens 10 is bilaterally symmetrical about plane 4 which includes emitter axis 2.

Figure 2:
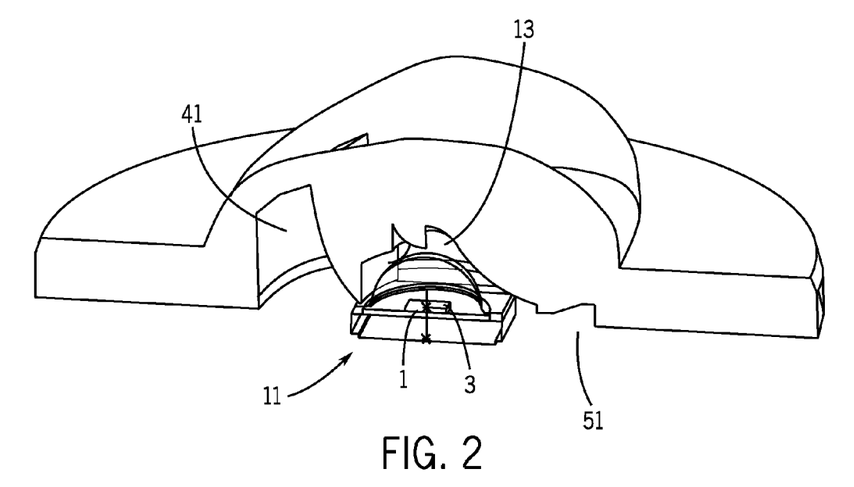
FIG. 2 is an enlarged cross-sectional non-transparent perspective view of the lens of FIG. 1 showing configurations of inner, back and front cavities as well as the outer surface.
Figure 3:
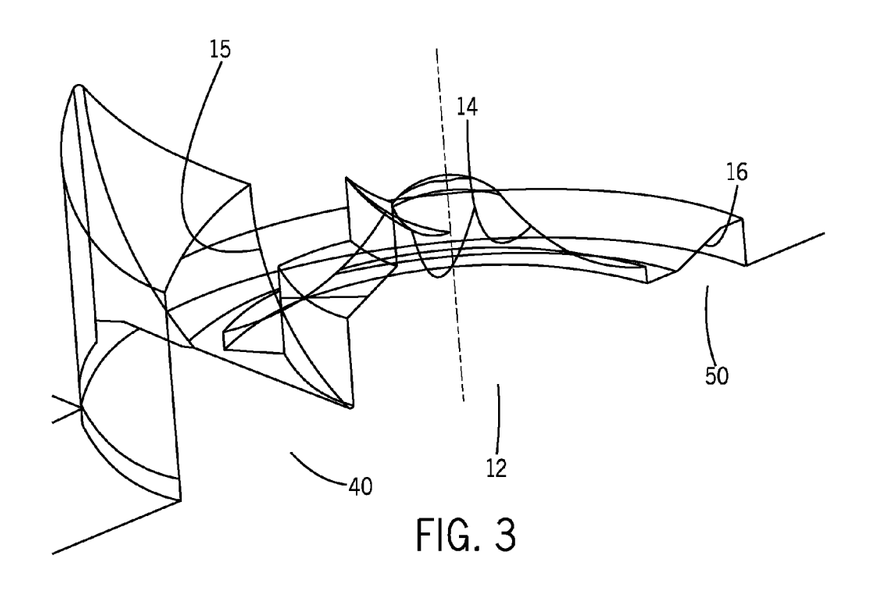
FIG. 3 is a greatly enlarged fragmentary cross-sectional perspective view of the lens of FIG. 1.

As best seen in FIGS. 1-4, emitter-adjacent base end 11 further forms a back opening 40 to a back cavity 41 substantially centered on non-preferential side 6 and partially bounded by primary back surface 15. It can be seen that primary back surface 15 transitions from near inner-surface back sector 30 at emitter plane 3 away from emitter axis 2 to terminate at a position distal from base end 11. FIGS. 1-4 further illustrate that back cavity 41 is further bounded by an axially-remote secondary back surface 42 and an end surface 43. End surface 43 extends from primary back surface 15 to secondary back surface 42. Secondary back surface 42 extends from end surface 43 to base end 11 substantially orthogonally to emitter plane 3 and, as best seen in FIGS. 3 and 6, has substantially elliptical cross-sections in planes parallel to emitter plane 3.

FIGS. 1-4 best show that the inner-surface back sector 30 includes an intermediate back zone 32 and an axially-adjacent back zone 33. Axially-adjacent back zone 33 joins intermediate back zone 32 by transitioning from emitter axis 2 away from emitter plane 3. It is seen that axially-adjacent back zone 33 is substantially cross-sectionally convex.

It is best seen in FIGS. 12-14 that intermediate back zone 32 is configured for refracting emitter light predominantly toward primary back surface 15 for TIR thereof toward preferential side 5. FIGS. 12-14 also show that axially-adjacent back zone 33 is configured for refracting emitter light away from emitter plane 3.

Figure 4:
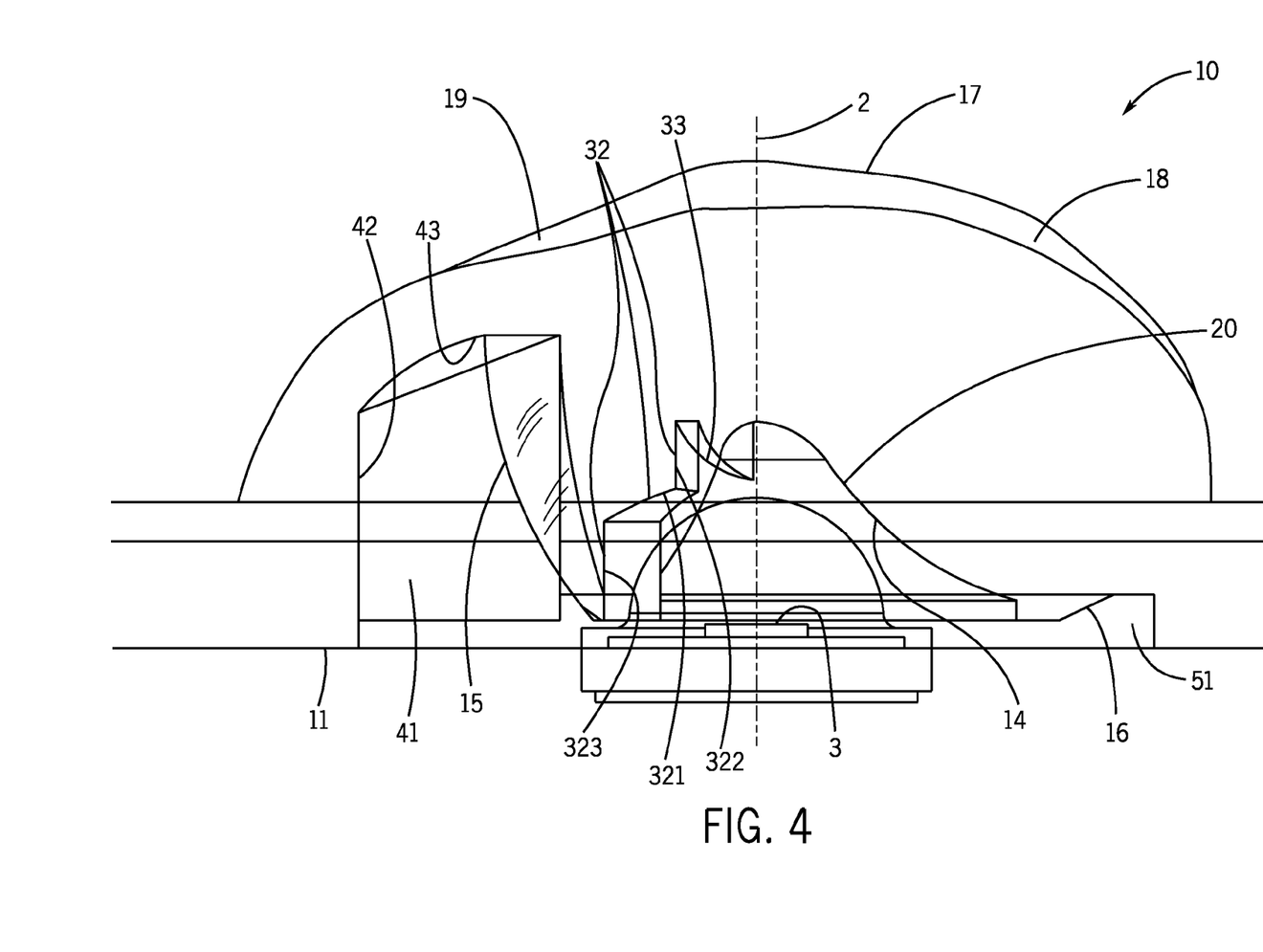
FIG. 4 is a greatly enlarged fragmentary cross-sectional side view of the lens of FIG. 1.

As best shown in FIGS. 2-4, intermediate back zone 32 includes a first intermediate back section 321 extending away from emitter axis 2, a second intermediate section 322 and a third intermediate section 323. Second intermediate back section 322 extends from first intermediate back section 321 to axially-adjacent back zone 33. Third intermediate back section 323 transitions from first intermediate back section 321 toward emitter plane 3. Second and third intermediate back sections 322 and 323 extend substantially orthogonally to emitter plane 3. FIGS. 5-9 illustrate that second and third intermediate back sections 322 and 323 each have substantially elliptical cross-sections in planes parallel to emitter plane 3. As best seen in FIGS. 12-14, third intermediate back section 323 is configured for refracting emitter light toward emitter plane 3 with progressively lesser refraction at positions progressively closer to emitter plane 3.

Inventive lens 10 further includes an outer surface 17 configured for refracting emitter light in predominantly off-axis directions toward preferential side 5. Outer surface 17 has front and back output regions 18 and 19. Outer surface 17 extends for a majority of the 180° about emitter axis 2 to provide a large refractive output surface for a wide-angle distribution of emitter light with improved control. FIG. 4 best shows that outer surface 17 extends for about 150° around emitter axis 2.

FIGS. 12-14 illustrate that back output region 19 is configured for refracting a preponderance of light received from inner-surface back sector 30 and primary back surface 15 toward preferential side 5. Back output region 19 is further configured for receiving at least a portion of light from first intermediate back surface 321 and distributing such light toward useful illumination of non-preferential side 6.

Figure 16:
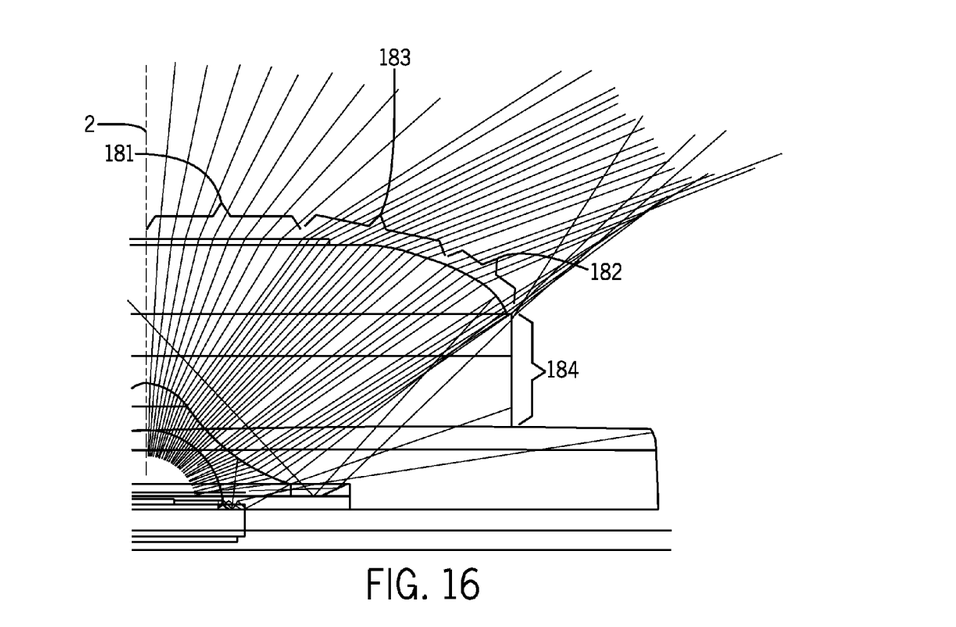
FIG. 16 is an enlarged fragmentary cross-sectional side view of the lens of FIG. 1 showing distribution of emitter light refracted as in FIG. 15 by outer-surface front output region.
Figure 17:
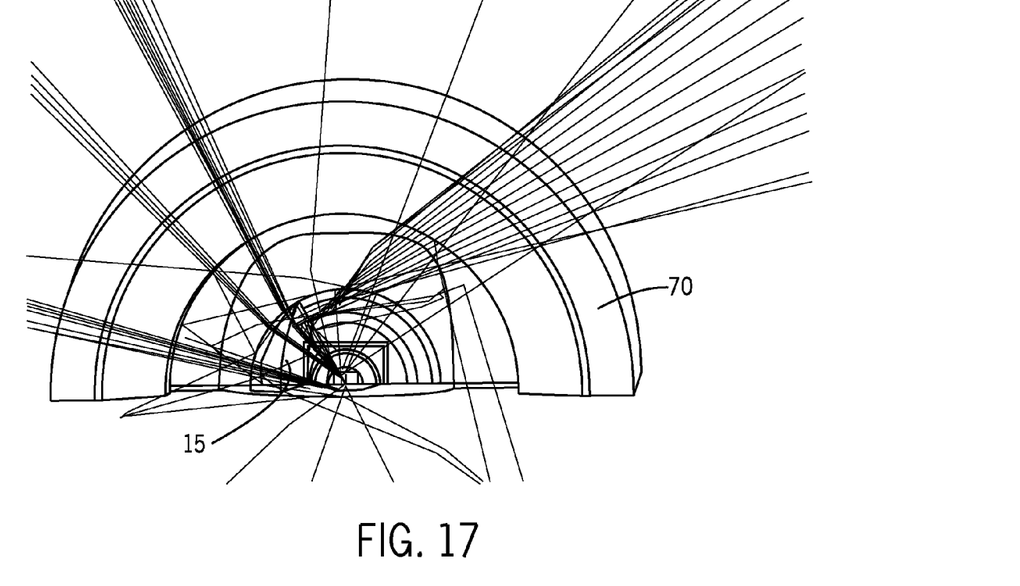
FIG. 17 is an enlarged fragmentary perspective top plan view of the lens of FIG. 1 showing distribution of the emitter light from the inner-cavity back sector and primary back surface.
Figure 18:
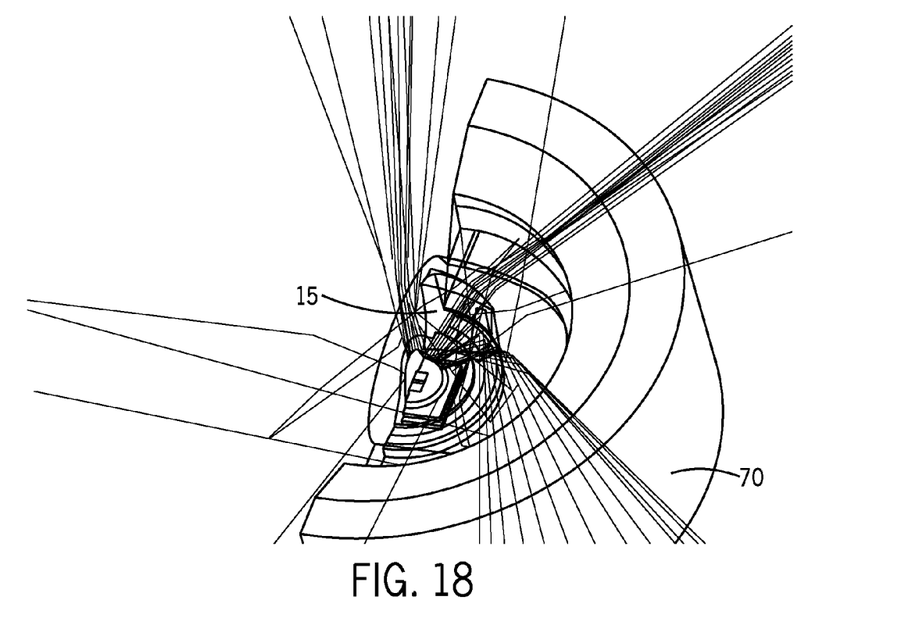
FIG. 18 is an enlarged fragmentary perspective front top view of the lens of FIG. 1 showing distribution of the emitter light from the inner-cavity back sector and primary back surface.
Figure 19:
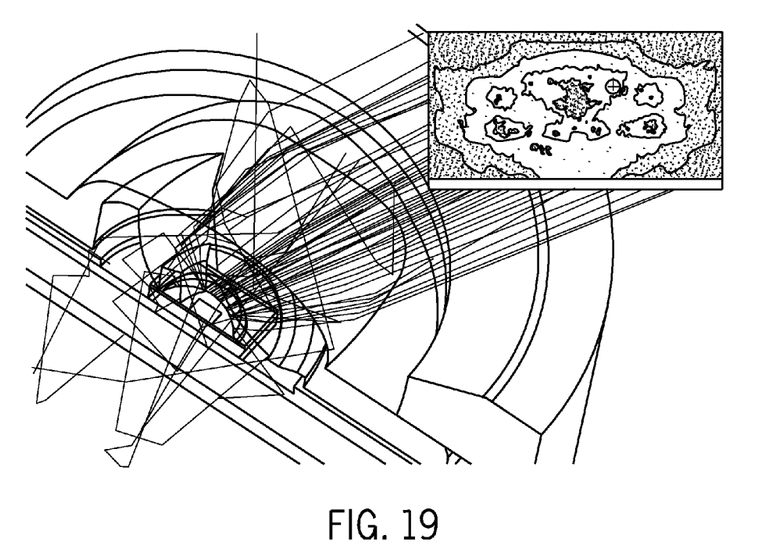
FIG. 19 is an enlarged fragmentary perspective side view from above of the lens of FIG. 1 showing a fragmental light trace and an illumination plot identifying position of this fragment of light thereon.
Figure 20:
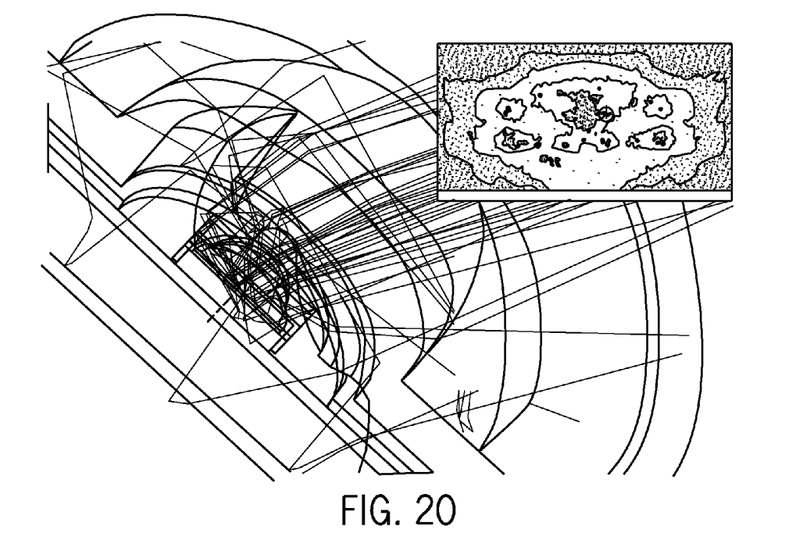
FIG. 20 is another enlarged fragmentary perspective side view from above of the lens of FIG. 1 showing a fragmental light trace and an illumination plot identifying position of this fragment of light thereon.

FIG. 16 shows outer-surface front output region 18 including an axis-adjacent first output area 181, a second output area 182 spaced from axis-adjacent first output area 181, and a middle output area 183 joining first and second output areas 181 and 182. Outer-surface front output region 18 further includes a base-adjacent outer-surface area 184 which extends from second output area 182 and is substantially free from receiving any emitter light. Base-adjacent outer-surface front area 184 is substantially orthogonal to emitter plane 3. It should be appreciated that, since the base-adjacent outer-surface front area 184 substantially does not participate in distribution of emitter light, it may have any configuration dictated by positioning and mounting of lens 10 or other factors such as material or space conservation.

Figure 15:
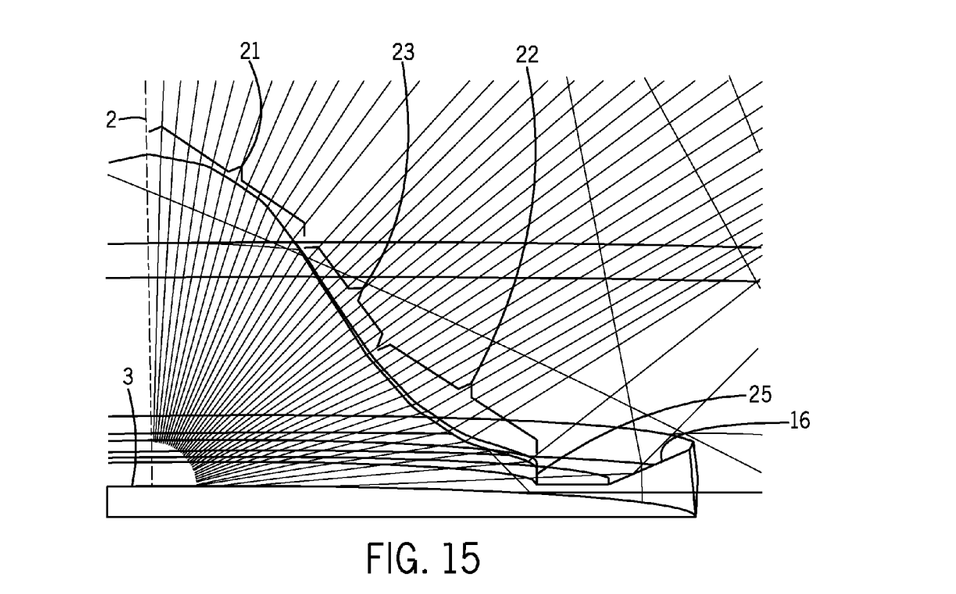
FIG. 15 is a greatly enlarged fragmentary cross-sectional side view of the lens of FIG. 12 showing refraction of the emitter light by the inner-cavity front-sector regions and a peripheral front surface.

FIG. 15 shows that inner-surface front sector 20 includes a first, second and middle front regions 21, 22 and 23, respectively. First front region 21 is adjacent to emitter axis 2 and is configured for refracting emitter light which passes through axis-adjacent first region 21 toward the emitter plane 3. This provides a broader distribution of the light emitted about axis 2 and allows enlargement of the size of outer-surface first output area 181 to achieve better refraction of light outside lens 10. Light received by axis-adjacent first front region 21 has the highest intensity because typically the highest illumination intensity of the emitter light is concentrated about axis 2. By refracting light toward emitter plane 3 (or away from axis 2), first front region 21 allows for dispersion of such light over a larger space. This improves uniformity of illumination intensity and substantially decreases a so-called "hot-spot" effect in a plot of illumination intensity distribution. FIG. 15 further illustrates that axis-adjacent first inner region 21 is substantially cross-sectionally concave.

Second front region 22 is spaced from first front region 21 and is configured for refracting emitter light away from emitter plane 3. It is seen in FIG. 15 that second inner region 22 is substantially cross-sectionally convex. Second front region 22 moves light, which mostly includes light emitted within about 30° from emitter plane 3, away from base-adjacent outer-surface front region 184. As can be seen in FIGS. 12, 13 and 17-20, base-adjacent outer-surface front area 184 is surrounded by structures 70 which may serve to secure lens 10 with respect to emitter 1 or be a shield blocking emitter light from going in an undesirable direction. As a result, any light that would arrive at base-adjacent front area 184 would be blocked by such structures 70 and would be eventually lost. In prior lenses, because some of the light was lost, to meet goals of desired polar candela plots, the outer surface had to be designed to bend some of the axis-adjacent light to the sides to provide required illumination. By refracting light received by second front region 22 away from emitter plane 3 (or toward emitter axis 2), this light is received by outer surface 17 at output area 182 which not only transmits such light out of lens 10 but also further refracts this light in a desired direction, i.e., toward emitter plane 3 for illumination farther from emitter axis 2, as shown in FIG. 16. Therefore, since such light from second front region 22 transmitted by second output area 182 provides desired illumination at the sides of desired illumination patterns, there is no need to bend axis-adjacent light transmitted by first output area 181.

In prior lenses, the space between the emitter and inner lens surface was filled with an optical gel such that the emitter light passed therethrough without refraction and arrived at the outer surface at the same angle as emitted. In such prior lenses, the outer surface was the only vehicle for light refraction. When compared to such prior lenses, the configuration of front output region 18 of outer surface 17 of lens 10 is unexpectedly substantially simpler than of those prior lenses. In the prior lenses, light arrived at the outer surface at a broad range of angles. Thus, almost all these angles had to be taken into account in forming that prior outer surface for refraction of light in a desirable direction. In lens 10, the direction of the majority of emitter light is initially substantially controlled by inner surface 14 and light from one of inner-surface front-sector regions is received substantially by only a corresponding one front output area of outer surface 17. As a result, each one front output area of outer surface 17 receives light which arrives at a substantially narrow sector of angles. This, coupled with improved efficiency eliminating the need for bending axis-adjacent light for side illumination, simplifies the configuration of the front output region 18 of outer surface 17 for refraction of such light in a desired direction and, therefore, decreases the probability of an irregularity impact on the light-output direction.

Middle front region 23 joins and is substantially cross-sectionally asymptotical to first and second front regions 21 and 22. Middle front region 23 is positioned with respect to emitter 1 to refract light toward emitter plane 3 by progressively lesser amounts at positions progressively closer to second front region 22. In some cases, middle region 23 may be configured and positioned to allow emitter light to pass therethrough with substantially no refraction. As best shown in FIG. 15, middle inner region 23 is substantially cross-sectionally linear. In other words, middle inner region 23 is of substantially truncated conical shape.

FIG. 16 shows that front output region 18 of outer surface 17 is configured for refracting light from inner-surface front sector 20 such that at outer surface 17 light from each of inner-surface front regions 21, 22 and 23 is refracted substantially without overlapping light from other inner-surface front regions. Each of output regions 181, 182 and 183 is configured for refracting the light from a corresponding one of inner-surface front regions 21, 22 and 23. As best seen in FIG. 16, axis-adjacent first output area 181 is configured for receiving emitter light from axis-adjacent inner-surface first front region 21 and further refracting such light toward emitter plane 3. Second output area 182 is configured for receiving emitter light from inner-surface second front region 22 and refracting such light substantially toward emitter plane 3. Middle output area 183 is configured for receiving emitter light from inner-surface middle front region 23 and refracting a majority of such light substantially toward emitter plane 3.

FIGS. 1, 2 and 10-12 best show a flange 71 that surrounds lens 10 substantially along emitter plane 3 and extends between base adjacent end 11 and outer surface 17. The illustrated embodiment shows lens 10 of the type that can be oriented for desired light distribution of each individual emitter 1. This allows each of a plurality of lenses 10 positioned over emitters on an LED-array module to be differently oriented to achieve desired illumination distribution from such LED-array module as a whole. In such embodiment, flange 71 serves to secure lens 10 about emitter 1 by sandwiching flange 71 between a printed circuit board and other structures 70 such as a sealing gasket or an LED-array module cover. It should be understood that this is just an exemplary configuration of lens 10. Outer surface 17 can have other configurations which would be dictated by an intended illumination pattern. Alternatively, lens 10 can be a part of a larger unit for positioning over a plurality of emitters and incorporating a plurality of lenses like lens 10 or of different configurations.

It is further seen in FIG. 15 that second front region 22 terminates before reaching emitter plane 3. Inner-surface front sector 20 further includes a base-adjacent front region 25 which extends from second front region 22 and is configured such that the light emitted between second front region 22 and emitter plane 3 passes through base-adjacent front region 25 substantially free of refraction.

Inventive lens 10 further includes a peripheral front surface 16 positioned to receive light from base-adjacent front region 25 and configured for total internal reflection (TIR) thereof toward outer surface 17. As best seen in FIG. 3, emitter-adjacent base end 11 forms a front opening 50 to a front cavity 51 centered on preferential side 5 and partially bounded by peripheral front surface 16.

FIGS. 5 and 6 show inner-surface front sector 20 of substantially circular annular cross-sections in planes substantially parallel to emitter plane 3. Alternatively, inner-surface front sector 20 and peripheral front surface can have shapes that result in substantially oval or ovoid cross-sections made in planes substantially parallel to emitter plane 3. In other words, these surfaces may have symmetries other than rotational. It should be further appreciated that, depending on the intended illumination pattern, the inventive lens may be shaped without symmetry and have asymmetrical surfaces.

While the principles of the invention have been shown and described in connection with specific embodiments, it is to be understood that such embodiments are by way of example and are not limiting.

The invention claimed is:

1. A lens for distribution of light predominantly toward a preferential side from a light emitter having an emitter axis, the lens comprising:
   an outer surface;
   a reflecting inner surface positioned and configured for total internal reflection (TIR) of received light toward the lens outer surface;
   a reflecting back surface positioned and configured for total internal reflection (TIR) of received light toward the preferential side; and
   a refracting inner surface comprising a front sector centered on the preferential side and a back sector centered on a non-preferential side radially opposite the preferential side and having a surface configuration differing from a front-sector surface configuration, the back sector of the refracting inner surface and the reflecting back surface having substantially elliptical cross-sections in planes substantially orthogonal to the emitter axis.

2. The lens of claim 1 wherein the reflecting back surface extends away from the emitter axis.

3. The lens of claim 1 wherein the reflecting inner surface is positioned to receive base-adjacent light.

4. The lens of claim 3 wherein the reflecting inner surface extends from an emitter-adjacent base end which forms a front opening to a front cavity centered on the preferential side and partially bounded by the reflecting inner surface.

5. The lens of claim 1 wherein the outer surface is configured for refracting emitter light in predominantly off-axis directions toward the preferential side.

6. The lens of claim 1 being substantially bilaterally symmetrical about a plane including the emitter axis.

7. A lens for distribution of light predominantly toward a preferential side from a light emitter having an emitter axis, the lens comprising:
   an outer surface;
   a refracting inner surface comprising a front sector centered on the preferential side and a back sector centered on a non-preferential side radially opposite the preferential side and having a surface configuration differing from a front-sector surface configuration, the front sector extends about the emitter axis along an arc that is greater than the arc along which the back sector extends;
   a reflecting inner surface positioned and configured for total internal reflection (TIR) of received light toward the lens outer surface; and
   a reflecting back surface positioned and configured for total internal reflection (TIR) of received light toward the preferential side.

8. The lens of claim 7 wherein the back-sector arc is about half the front-sector arc.

9. A lens for distribution of light predominantly toward a preferential side from a light emitter having an emitter axis, the lens comprising:
   an outer surface;
   a reflecting inner surface positioned and configured for total internal reflection (TIR) of received light toward the lens outer surface; and
   a reflecting back surface positioned and configured for total internal reflection (TIR) of received light toward the preferential side
   an emitter-adjacent base end forming an emitter-receiving opening to the emitter-surrounding cavity and a back opening to a back cavity substantially centered on the non-preferential side and partially bounded by the reflecting back surface, the back cavity being further bounded by an axially-remote secondary back surface and an end surface extending from the primary back surface to the secondary back surface, the secondary back surface extending from the end surface to the base end and having substantially elliptical cross-sections in planes substantially orthogonal to the emitter axis.

10. The lens of claim 9 further comprising a refracting inner surface which has:
a front sector centered on the preferential side; and
a back sector centered on a non-preferential side radially opposite the preferential side and having a surface configuration differing from a front-sector surface configuration.

11. The lens of claim 10 wherein the front sector of the refracting inner surface has a substantially smooth surface configuration extending to the juncture of the front and back sectors.

12. A lens for distribution of light predominantly toward a preferential side from a light emitter having an emitter axis, the lens comprising:
an outer surface having front and back output regions, the back output region being configured for refracting a preponderance of received light toward the preferential side;
a reflecting inner surface positioned and configured for total internal reflection (TIR) of received light toward the lens outer surface; and
a reflecting back surface positioned and configured for total internal reflection (TIR) of received light toward the preferential side.

13. The lens of claim 12 further comprising an emitter-adjacent base end forming an emitter-receiving opening to an emitter-surrounding cavity.

14. The lens of claim 13 wherein the emitter-adjacent base end forms a peripheral opening to a cavity which is partially bounded by the reflecting inner surface.

15. The lens of claim 13 wherein the emitter-surrounding cavity is defined by a refracting inner surface comprising:
a front sector centered on the preferential side; and
a back sector centered on a non-preferential side radially opposite the preferential side and having a surface configuration differing from a surface configuration of the front sector.

16. The lens of claim 15 wherein the back sector of the refracting inner surface and the reflecting back surface have substantially elliptical cross-sections in planes substantially orthogonal to the emitter axis.

17. The lens of claim 15 wherein the reflecting back surface transitions from near the inner-surface back sector and terminates at a position distal from the base end.

18. The lens of claim 13 wherein the emitter-adjacent base end forms a back opening to a back cavity substantially centered on the non-preferential side and partially bounded by the reflecting back surface.

19. A lens for distribution of light predominantly toward a preferential side from a light emitter having an emitter axis and defining an emitter plane, comprising:
an outer surface configured for refracting emitter light;
an emitter-adjacent base end forming an emitter-receiving opening to an emitter-surrounding cavity defined by a refracting inner surface comprising a front sector centered on the preferential side and a back sector centered on a non-preferential side radially opposite the preferential side and having a surface configuration differing from a front-sector surface configuration, the front sector having a substantially smooth surface configuration extending to the juncture of the front and back sectors;
a reflecting inner surface positioned and configured for total internal reflection (TIR) of light from the emitter; and
a reflecting back surface positioned to receive light from at least a portion of the refracting inner surface and configured for total internal reflection (TIR) of such light.

20. The lens of claim 19 wherein the emitter-adjacent base end forms a front opening to a front cavity partially bound by the reflecting inner surface positioned to receive light from a base-adjacent region of the refracting inner surface and configured for total internal reflection (TIR) thereof toward the lens outer-surface.

* * * * *